United States Patent [19]

Baugh

[11] 4,269,277
[45] May 26, 1981

[54] POWER SLIP ASSEMBLY

[75] Inventor: Benton F. Baugh, Houston, Tex.

[73] Assignee: Brown Oil Tools, Inc., Houston, Tex.

[21] Appl. No.: 54,160

[22] Filed: Jul. 2, 1979

[51] Int. Cl.³ .................. B23Q 5/027; B23Q 5/033
[52] U.S. Cl. ............................. 173/149; 24/263 DT
[58] Field of Search ................. 173/163, 149, 164; 24/263 DT, 263 CA; 64/23.6

[56] References Cited

U.S. PATENT DOCUMENTS

| | | | |
|---|---|---|---|
| 3,096,075 | 7/1963 | Brown | 254/29 |
| 3,722,603 | 3/1973 | Brown | 173/159 |
| 3,742,563 | 7/1973 | Brown | 24/263 DH |
| 3,748,702 | 7/1973 | Brown | 24/263 DG |
| 3,760,469 | 9/1973 | Brown | 24/263 DQ |
| 3,776,320 | 12/1973 | Brown | 173/163 |
| 3,915,244 | 10/1975 | Brown | 175/85 |
| 3,964,552 | 6/1976 | Slator | 173/164 |

*Primary Examiner*—Ronald Feidbaum

*Attorney, Agent, or Firm*—Robert A. Felsman; E. Richard Zamecki

[57] ABSTRACT

Disclosed are apparatus for gripping and manipulating pipe members, including a plurality of slip carriers mounted on an equal number of carrier actuators. The carrier actuators are arranged within a drive sleeve and constrained by radial T-slot connections to a base ring. Sloped T-slot connections link each of the carrier actuators to the drive sleeve. Longitudinal movement of the drive sleeve in one sense propels the carrier actuators and the slip carriers radially inwardly whereby slips mounted on the slip carriers may grip a pipe member positioned within the drive sleeve; longitudinal movement of the drive sleeve in the opposite sense withdraws the carrier actuators and slip carriers from the pipe member. Cooperating wedging surfaces between each of the slip carriers and the corresponding carrier actuator permits the application of holding or moving force on pipe members in either longitudinal sense. The base ring may be rotated by means of a chain drive mechanism to thereby apply torque to pipe members by way of the slips.

32 Claims, 13 Drawing Figures

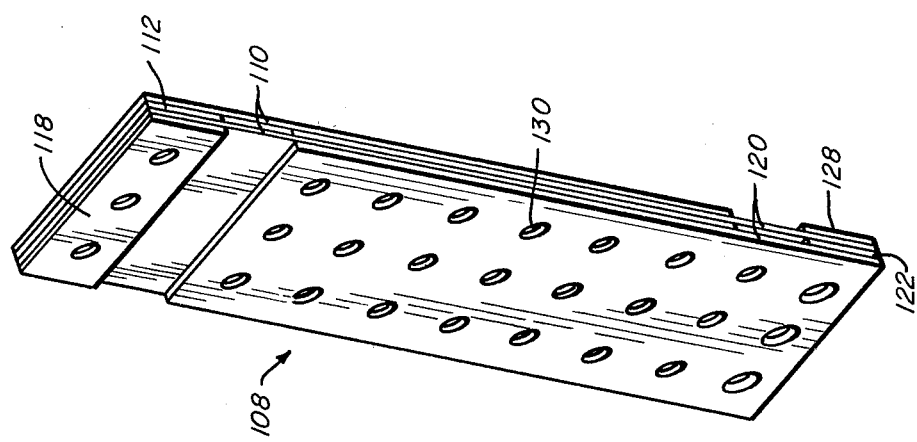
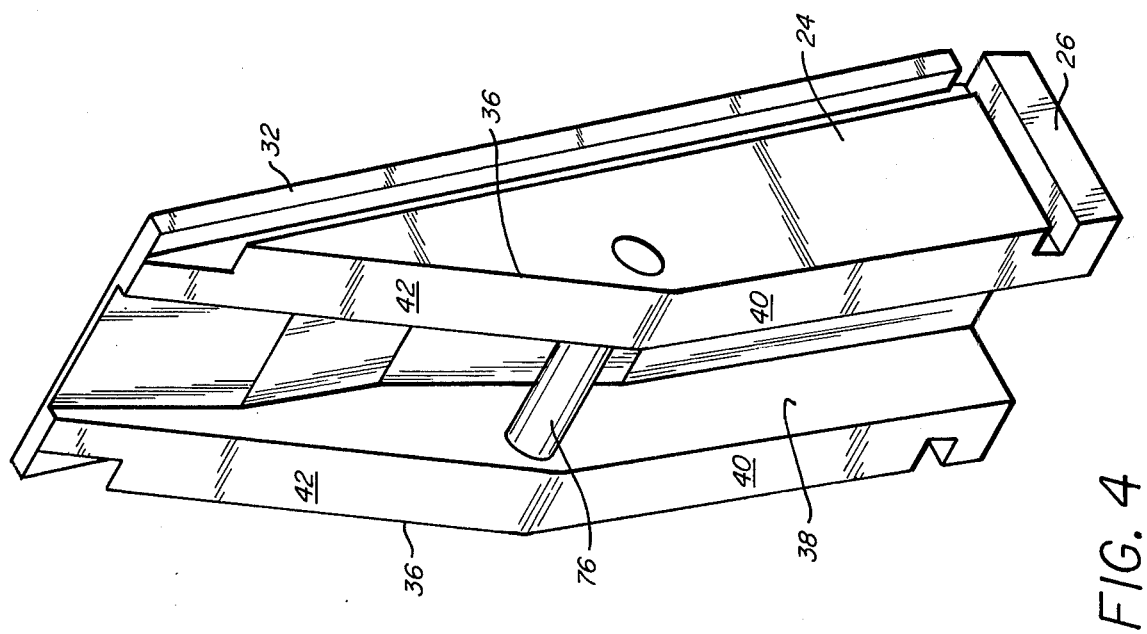
FIG. 5
FIG. 4

POWER SLIP ASSEMBLY

BACKGROUND OF THE INVENTION

1. Field of the Invention

The present invention pertains to apparatus for gripping and manipulating tubular members, such as pipe members. More particularly, the present invention relates to apparatus for manipulating pipe members into and out of wells, and finds particular application in workover rigs and snubbing units.

2. Description of Prior Art

In the drilling and operation of wells, it is frequently necessary to insert or remove strings of pipe into or out of wells. Such pipe manipulation often takes place while the well is under high fluid pressure. Under such conditions devices have been employed for forcing the tubing through suitable stuffing boxes, such as are formed by blowout preventers and the like, to maintain control of the pipe string as it is being run into or out of the well. Such devices are commonly referred to as "snubbers".

While snubbers are usually designed primarily for forcing the pipe string down into a well against downhole fluid pressure resisting such motion by the pipe string, similar devices are known for applying upward forces to support part or all of the weight of a tubing string in the case of low pressure or dead wells, as well as to raise the tubing string from the well. Also, where it is desired to eliminate the need for a separate rotary drive device to impart torque to pipe members, or even rotate the entire pipe string, a pipe gripping head, such as a snubber head, may be mounted to be driven rotationally while gripping the pipe.

Typical snubbers and like devices are constructed with a pair of heads equipped with slips for gripping the pipe members. One head, such as the lower head, is usually held stationary relative to the well while the other head, known as the traveling head, is selectively manipulated back and forth above the stationary head. By appropriate gripping and releasing of the pipe string by each of the heads, pipe may be advanced into the well or removed therefrom. One or the other of the heads may be rotatable to rotate the pipe gripped thereby while the other head may lock pipe gripped thereby against rotation.

U.S. Pat. No. 3,722,603 discloses a fluid pressure-operated snubber device including two snubbing members, or heads, equipped with pipe-gripping wedges and cam actuated shoes for applying torque to pipe. One of the snubbing members is stationary and one is rotatable and vertically reciprocable.

In the apparatus disclosed in U.S. Pat. No. 3,742,563, a gripping assembly includes a set of slips and a set of wedges by which the slips may be wedged into gripping engagement with pipe. Cam means are provided to cooperate with the wedges to move the slips into tighter engagement with the pipe upon rotation of the pipe. U.S. Pat. No. Re. 25,860 a reissue of U.S. Pat. No. 3,096,075 and U.S. Pat. Nos. 3,760,469 and 3,748,702 further disclose means whereby slip segments may be driven generally radially into gripping engagement with pipe, and grip the pipe for application of forces thereto in either axial direction.

U.S. Pat. Nos. 3,776,320; 3,915,244 and 3,964,552 disclose elevator assemblies including slips which are generally radially movable by camming mechanisms to apply torque to pipe.

It is advantageous to effect gripping engagement between slips and pipe to be manipulated without sliding motion between the slips and the pipe to minimize wear on the slips. Further, it is advantageous to effect such gripping engagement to impart forces to the pipe parallel to the longitudinal axis of the pipe in both senses, as well as to impart torque to the pipe about that axis, with the same set of slips, and without the necessity of disengaging and reorienting the slips to effect the different forces.

SUMMARY OF THE INVENTION

The present invention provides apparatus for manipulating pipe members, including a plurality of slip carriers for carrying slips, or dogs, to grippingly engage such pipe members and impart forces thereto. Each of the slip carriers is linked to a carrier actuator. The carrier actuators are arranged about a passage wherein the pipe members may be positioned, and are mounted for radial movement to selectively propel the slip carriers radially inwardly for engagement of the slips with such pipe members, and to selectively withdraw the slip carriers radially outwardly to disengage the slips from the pipe members. A generally tubular drive sleeve circumscribes, at least in part, the plurality of carrier actuators and is linked thereto so that longitudinal movement of the drive sleeve imparts radial movement to the carrier actuators. Thus, the longitudinal movement of the drive sleeve in one sense propels the carrier actuators radially inwardly to effect a gripping engagement between the slips carried by the slip carriers and a pipe member positioned within the arrangement of slip carriers. Longitudinal movement of the drive sleeve in the opposite sense causes the carrier actuators and slip carriers attached thereto to be radially withdrawn, thereby disengaging the slips from the pipe member. The drive sleeve may be selectively moved longitudinally by means of a fluid pressure drive mechanism, such as one or more fluid pressure piston-and-cylinder assemblies.

The carrier actuators may be so mounted for radial movement by means of individual T-slot connections radially oriented about the passage. Each carrier actuator may also be linked to the drive sleeve by a T-slot connection that slants toward the passage. Then, as the drive sleeve is moved parallel to the passage, the carrier actuators are propelled along the radial T-slot connections by the slanted T-slot connections. To insure that forces acting on the slips due to the pipe gripped thereby do not move the carrier actuators radially outwardly to propel the drive sleeve, a friction-increasing mechanism may be employed in the linkage between the drive sleeve and the carrier actuators. The friction mechanism includes a plurality of meshed plates that increases the effective surface area of contact between the drive sleeve and each of the carrier actuators.

The drive sleeve, carrier actuators, and carrier slips are mounted for selective rotational movement about the longitudinal axis of the drive sleeve for imparting torque, by way of the slips, to pipe members grippingly engaged thereby. Further, the slips may impart forces to the pipe gripped thereby parallel to the longitudinal axis of the pipe in both senses. Apparatus according to the present invention may be mounted, for example, to be raised or lowered while the slips grip a vertically-oriented pipe member, thereby transmitting upwardly-directed forces or downwardly-directed forces, respectively, to the pipe member.

A system of wedging surfaces is included in the linkage between each of the slip carriers and the corresponding carrier actuator. When the slips engage a pipe member, and upwardly-directed forces are imparted to the pipe member by the slip assembly, the slip carriers are driven slightly downwardly relative to the carrier actuators by the operation of the forces effected by the pipe member. With the slip carriers thus displaced relative to the carrier actuators, abutting slanted surfaces between the slip carriers and the carrier actuators cooperate to wedge the slip carriers tightly against the pipe member thereby increasing the forces by which the slips grip the pipe member. Similarly, when downwardly-directed forces are imparted to a pipe member grippingly engaged by the power slip assembly, the slip carriers are displaced slightly upwardly due to the forces imparted thereto by the pipe member. With such displacement between the slip carriers and the carrier actuators, slanted surfaces of both the slip carriers and the carrier actuators cooperate to wedge the slip carriers tightly against the pipe member to increase the forces by which the slips engage the pipe member. In both cases, when the carrier actuators and slip carriers are withdrawn radially from gripping engagement with the pipe member, centering mechanisms included in the slip carriers return the slip carriers to their normal vertical positions relative to the carrier actuators. Thus, the slip carriers are automatically in configuration virtually immediately to re-engage a pipe member to grip the pipe member as well as to apply upwardly or downwardly directed forces. In any gripping configuration between the slip carriers and a pipe member, the slip carriers and the slips mounted thereon are in configuration for applying torque, or conveying rotary motion, to the pipe member.

The present invention may be utilized as a gripping head on a snubbing unit used to drive pipe members into wells. Similarly, the present invention may be used to grip pipe during well working operations in which pipe members are withdrawn from wells. The present invention may also be utilized as a rotary drive head in both operations, and may be further mounted as either a stationary head or a traveling head in such a snubbing or well working unit.

Since the slips carried by the slip carriers are moved only radially relative to the pipe members to effect engagement or disengagement thereof, the rate of wear of the slips is minimized.

BRIEF DESCRIPTION OF THE DRAWINGS

FIG. 4 is a perspective view of the carrier actuator of FIG. 3, but taken from a different angle;

FIG. 5 is a perspective view of a friction plate assembly used in linking a carrier actuator to the drive sleeve of the power slip assembly;

DESCRIPTION OF PREFERRED EMBODIMENT

Figure 1:
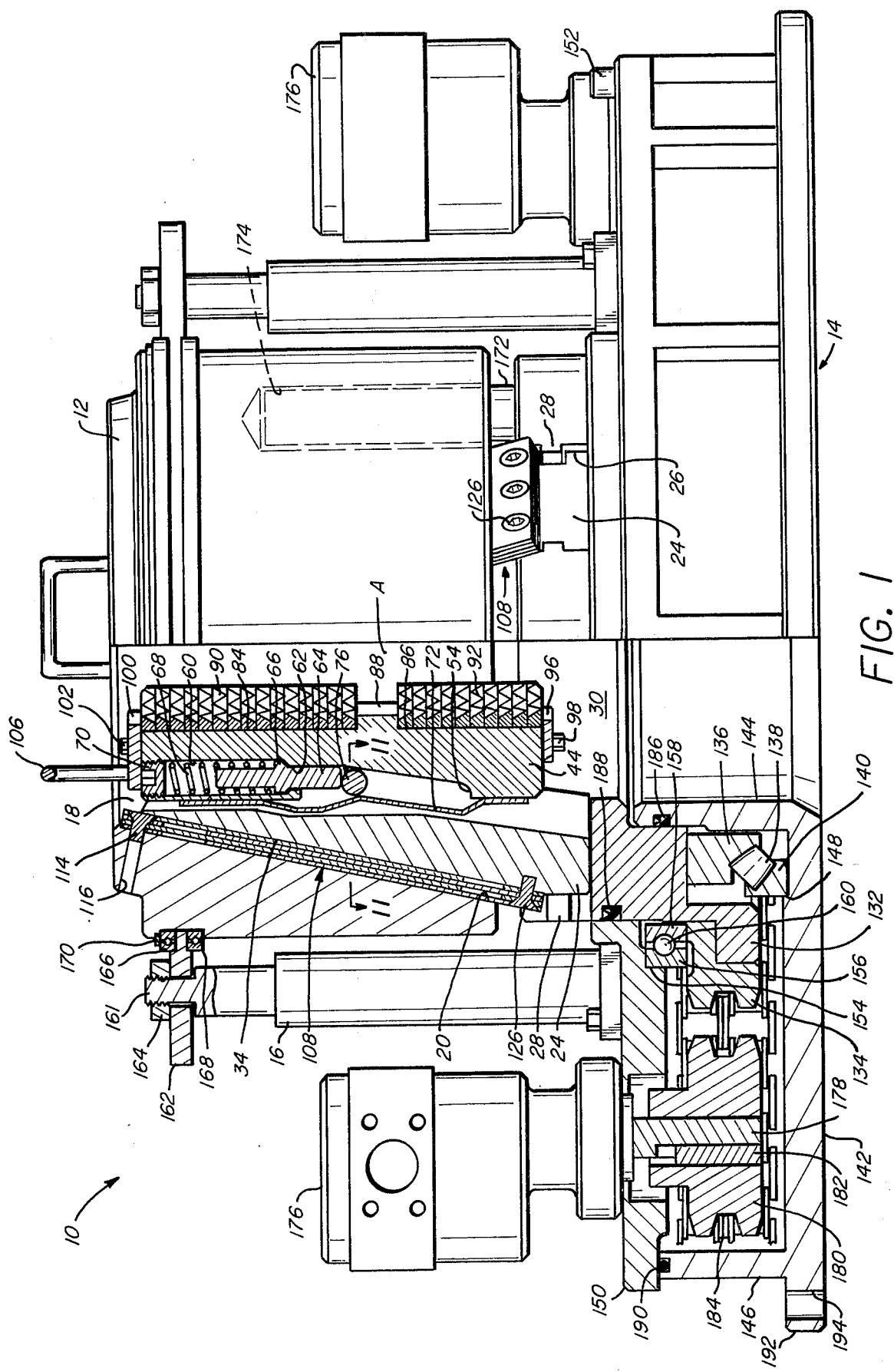
FIG. 1 is a side elevation in partial section of a power slip assembly according to the present invention.
Figure 10:
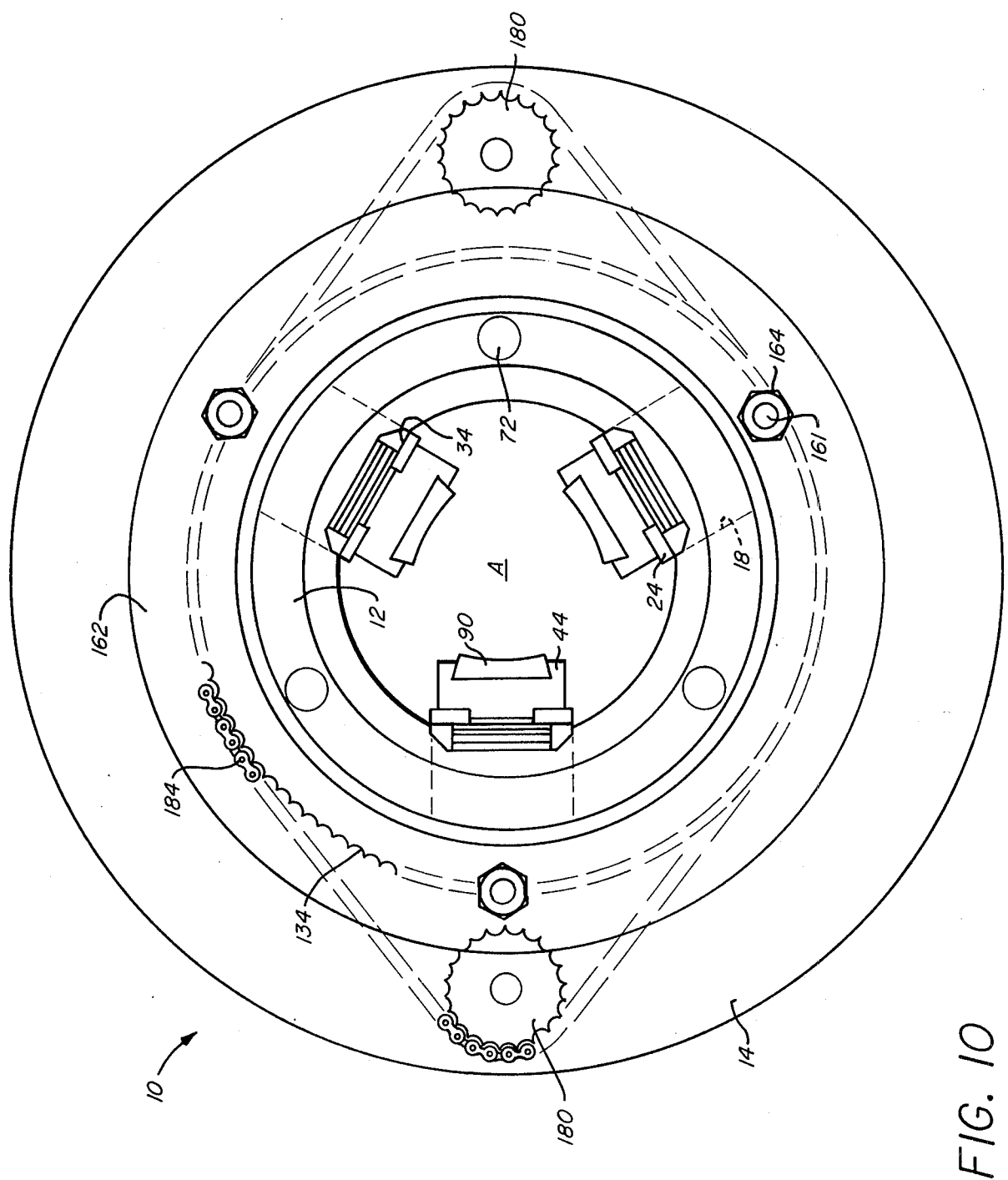
FIG. 10 is a schematic plan view of the power slip assembly illustrating the relative locations of various components thereof.

A power slip assembly according to the present invention is shown generally at 10 in FIGS. 1 and 10. A drive sleeve, or slip bowl, 12 is supported on a base, shown generally at 14, by three fluid pressure piston-and-cylinder assemblies 16. The drive sleeve 12 is generally tubular with a longitudinal passage A therethrough for receiving pipe members. The passage A continues through the base 14.

The interior of the drive sleeve 12 features three longitudinal identations 18, radiating generally outwardly from the passage A. The radially outward limit of each indentation 18 is defined generally by a slanted inner surface 20 of the drive sleeve 12. An elongate female T-slot connector is formed by a pair of rails 22 extending into the opposite sides of each of the indentations 18, and generally following the slant of the surface 20 (cf FIG. 11).

Figure 3:
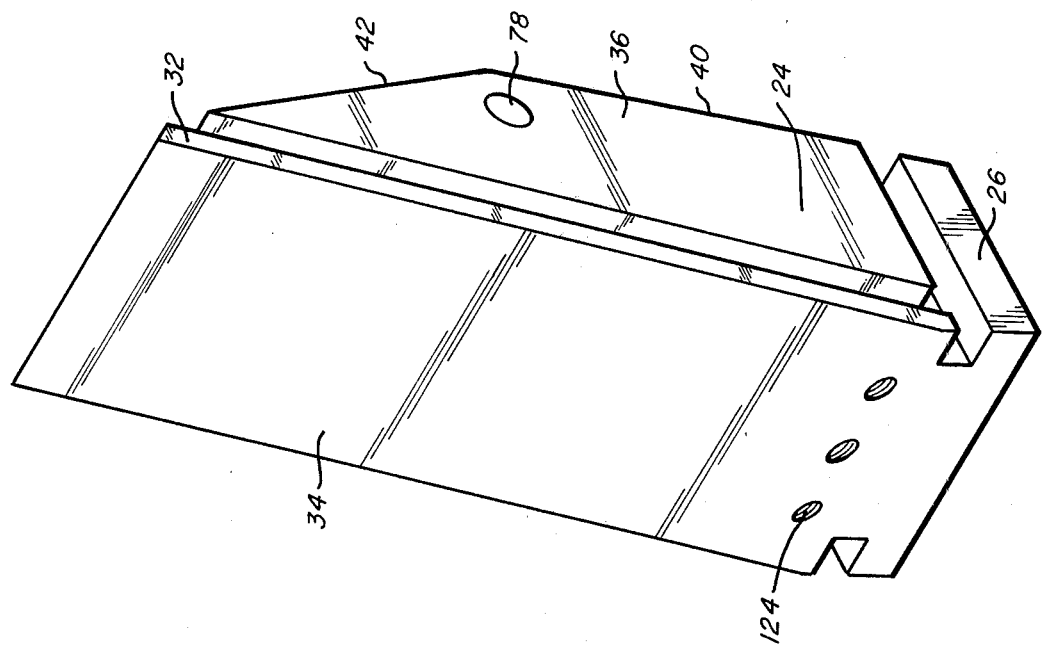
FIG. 3 is a perspective view of a carrier actuator of the power slip assembly.
Figure 11:
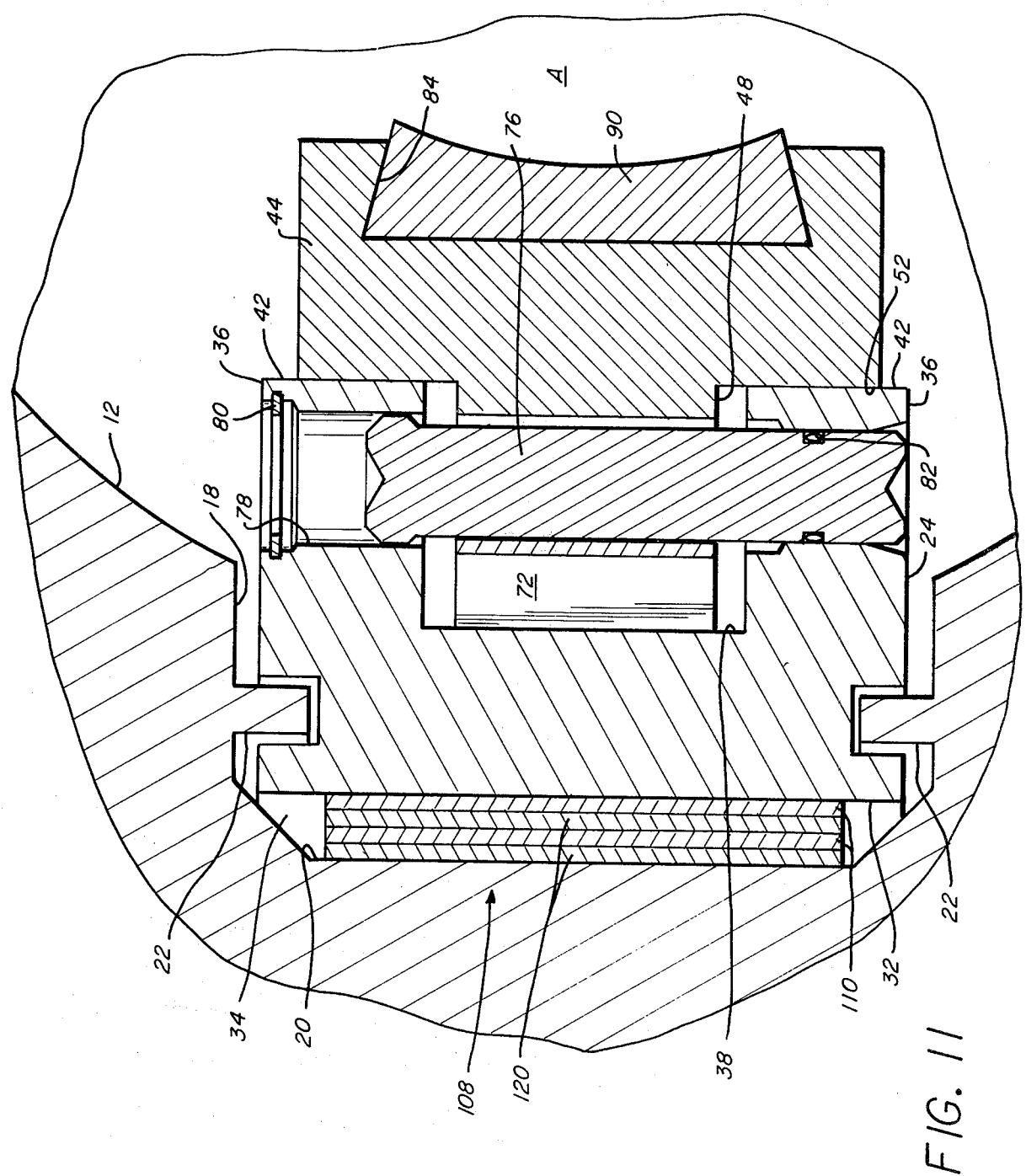
FIG. 11 is a fragmentary cross-sectional view taken along line 11—11 of FIG. 1.

Each of the indentations 18 receives a carrier actuator 24. FIGS. 3, 4 and 11 illustrate details of a carrier acuator 24. A male T-slot connector 26 forms the base of the carrier actuator 24, and is received by a female T-slot connector 28 extending upwardly from a base ring 30 oriented generally along a plane perpendicular to the longitudinal axis of the drive sleeve 12 and of the passage A (FIG. 1). The back of the carrier actuator 24 is in the form of an elongate male T-slot connector 32, including an outer surface 34. The T-slot connector 32 is received by the female T-slot connector 22 at the back of a drive sleeve indentation 18. The connector 32 is sloped at the same angle as the drive sleeve surface 20. Thus, with the connectors 26 and 32 received by the complimentary connectors 28 and 32, respectively, the surfaces 20 and 34 are parallel.

The front of each carrier actuator 34 features a pair of elongate projections 36 separated by an elongate indentation 38 (FIGS. 4 and 11). Each of the projections 36 defines a leading lower surface 40 and a leading upper surface 42. The surfaces 40 and 42 are sloped so that, with the carrier actuator 24 received in the T-slot connectors 22 and 28 as shown in FIGS. 1, 8A and 9A, the surfaces 40 and 42 are each oriented at approximately the same angle relative to the longitudinal axis of the drive sleeve 12, but with the surfaces 42 sloping upwardly and away from the axis and the surfaces 40 sloping downwardly and away from the axis.

Figure 2:
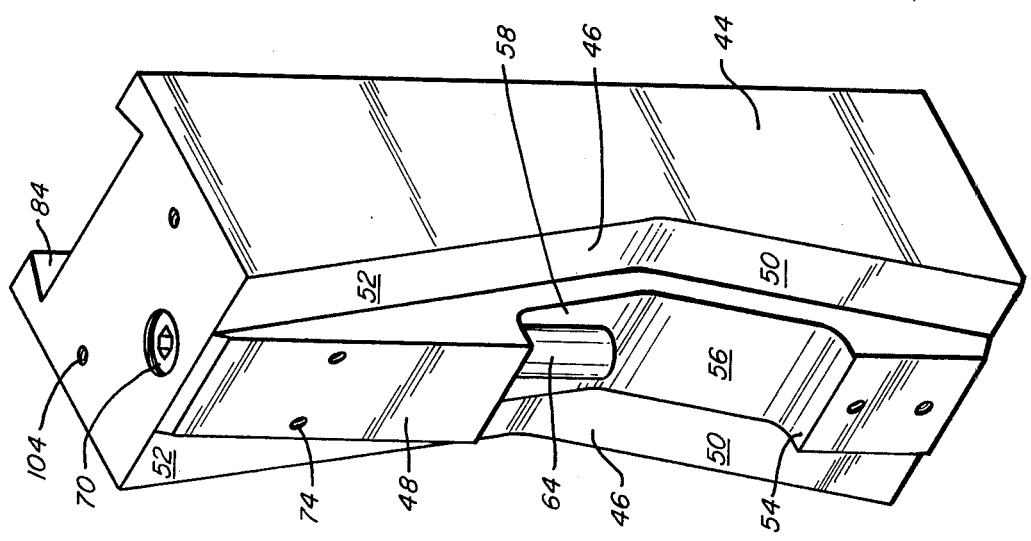
FIG. 2 is a perspective view of a slip carrier of the power slip assembly, with the retainer band removed.

Each of the carrier actuators 24 receives a slip carrier 44, details of which may be appreciated by reference to FIGS. 1 and 2. The back of each slip carrier 44 features a pair of elongate depressions 46 separated by an elongate projection 48. Each of the depressions 46 defines a sloped lower surface 50 and a sloped upper surface 52. The slopes of the surfaces 50 and 52 are complimentary to the slopes of the surfaces 40 and 42, respectively.

The elongate projection 48 is broken by a cutout 54. The cutout 54 includes a sloped generally planar surface 56 which is parallel to the surfaces 50, and a sloped generally planar surface 58 which is parallel to the surfaces 52.

As may be appreciated by reference to FIG. 1, a bore 60 communicates from the top of the slip carrier 44 into the upper portion of the projection 48. A counterbore 62 of lesser diameter meets the bore 60 from the bottom of the upper part of the projection 48. A plunger 64 extends downwardly from within the bore 60 and through the counterbore 62 below the upper portion of the projection 48 and into the cutout 54 in the vicinity of the surface 58. The plunger 64 is equipped with a flange 66 which prevents the plunger from passing through the counterbore 62. A coil spring 68 is confined within the bore 60 and constrained between the upper surface of the flange 66 and a plug 70 threadedly engaged to the slip carrier 44 at the top of the bore 60. The spring 68 thus maintains the plunger 64 biased downwardly.

A retainer band 72 is mounted on the back of the slip carrier 44 at the upper and lower portions of the projection 48. Threaded holes 74 are provided on the projection to receive bolts for this purpose. The band 72 thus spans the cutout 54 of the projection 48.

Each slip carrier 44 is mounted on a corresponding carrier actuator 24 by positioning the slip carrier projection 48 generally within the carrier actuator indentation 38. A pin 76 is then inserted through appropriate bores 78 passing through the projections 36 of the carrier actuator 24. The pin 76 thus traverses the carrier actuator indentation 38, passing between the band 72 and the surfaces 56 an 58 of the slip carrier projection. With the pin 76 thus confined, the slip carrier 44 is fastened to the carrier actuator 24 with only limited motion of the slip carrier relative to the carrier actuator permitted. The retainer band 72 generally parallels the slip carrier surface 56 to define a path for passage of the pin 76 as the slip carrier 44 is raised relative to the carrier actuator 24. The slip carrier 44 may thus be raised relative to the carrier actuator 24 until the pin 76 abuts the lower limit of the projection cutout 54. The retainer 72 also parallels the cutout surface 58 to accommodate the pin 76 as the slip carrier 44 is forced downwardly relative to the carrier actuator 24. Such downward movement of the slip carrier 44 relative to the carrier actuator 24 causes the pin 76 to force the plunger 64 further into the bore 60 to compress the spring 68, and is limited by the upper limit of the cutout 58 abutting the pin. Gravity tends to move the slip carrier 44 downwardly relative to the carrier actuator 24, but the plunger 64 and the compressed spring 68 cooperate to raise and maintain the slip carrier positioned relative to the carrier actuator so that the pin 76 is normally located at the junction of the surfaces 56 and 58.

No significant radial motion by the slip carrier 44 relative to the carrier actuator 24 is permitted due to the confinement of the pin 76 between the surfaces 58 and 56 and the retainer band 72. Further, motion by the slip carrier 44 toward the carrier actuator 24 is limited by the abutment of the slip carrier surfaces 50 and 52 against the carrier actuator surfaces 40 and 42, respectively, as well as the proximity of the band 72 to the back surface of the carrier actuator indentation 38. As may be appreciated from FIGS. 1 and 4, the back surface of the carrier actuator indentation 38 may be shaped to accommodate the shaping of the retainer 72 to generally parallel the slip carrier surfaces 56 and 58. The relative positions of the slip carrier surfaces 50 and 52 and the carrier actuator surfaces 40 and 42 may be more fully appreciated by reference to FIGS. 8A and 9A, and will be discussed in further detail hereinafter.

Various methods may be employed to prevent inadvertent removal of the pins 76 from the bores 78. As may be seen by reference to FIG. 11, a snap ring 80 may be positioned within an appropriate groove lining the bore 78 to prevent movement of the pin 76 out through the bore. Also, the pin 76 may be equipped with a friction-providing O-ring 82 residing in an appropriate groove in the pin and engaging the interior wall of the bore 78 to inhibit movement between the pin and the bore wall.

As may be appreciated by reference to FIGS. 1, 2 and 11, the front of each of the slip carriers 44 is provided with an upper longitudinal dove-tail groove 84 which extends along approximately one-half the length of the face of the slip carrier. A shorter, lower dove-tail groove 86 (FIG. 1) extends upwardly from the bottom of the slip carrier 44. The grooves 84 and 86 are separated by an arcuate transversly-extending shoulder 88. The upper groove 84 receives a set of slips, or dogs 90, oriented to provide gripping engagement with pipe members and to impart upwardly-directed force to said pipe members. The lower groove 86 receives a set of dogs, or slips 92, oriented to grippingly engage pipe members and to impart downwardly-directed force to said pipe members. Both sets of slips 90 and 92 may also impart torque, or rotary force to said pipe members.

The design of the gripping faces of the slips 90 and 92 may be such that each set of slips is capable of imparting force to pipe members in both vertical senses, as well as imparting torque to the pipe members about their longitudinal axes. As illustrated, the slips 90 and 92 are equipped with diamond tread faces capable of imparting force in any tangential direction.

It will be appreciated that, as upwardly-directed force is imparted through the slip carrier 44 and the upper slips 90, the shoulder 88 effectively transmits such force to the slips 90 and thereby bears the force-transmitting load. Similarly, as downwardly-directed force is imparted through the slip carrier 44 and the lower slips 86 to the pipe members, such force is transmitted by the shoulder 88 which thereby bears the load again. The load for imparting torque to such pipe members by way of the upper and lower slips 90 and 92, respectively, is borne by the body of the slip carrier 44 itself, and particularly the portions defining the dove-tail slots 84 and 86. To accommodate such torque transmission, the slip carrier extension 48 fits relatively loosely between the carrier actuator projections 36, as may be appreciated from FIG. 11. Consequently, when torque is to be applied to pipe members, a slight sideways backshifting of the slip carriers 44 relative to the carrier actuators 24 occurs to maximize the torque-imparting gripping engagement between the slips 90 and 92 and the pipe member in question and to provide a wedging of the slip carriers between the pipe member and the corresponding carrier actuators.

A bottom plate 96 encloses the lower slips 92 in the lower groove 86, and is held to the slip carrier 44 by bolts 98. A top plate 100 similarly confines the upper slips 90 within the upper groove 84, and is held to the slip carrier body 44 by bolts 102. Threaded holes 104 are shown in FIG. 2 at the top of the slip carrier 44 to receive the bolts 102 for this purpose. A handle 106 extends upwardly from each of the top plates 100 to provide easy and convenient means for positioning the slip carriers 44 in place for fastening to the carrier actuators 24 and for removal therefrom.

Figure 7:
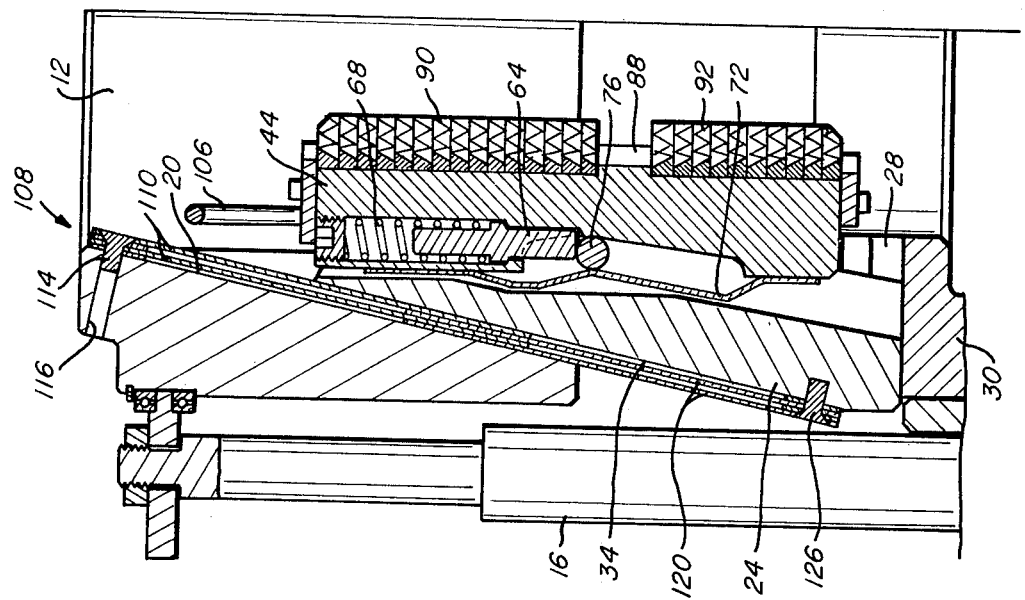
FIG. 7 is a view similar to FIG. 6, but with the drive sleeve raised to retract the slip carriers outwardly.
Figure 6:
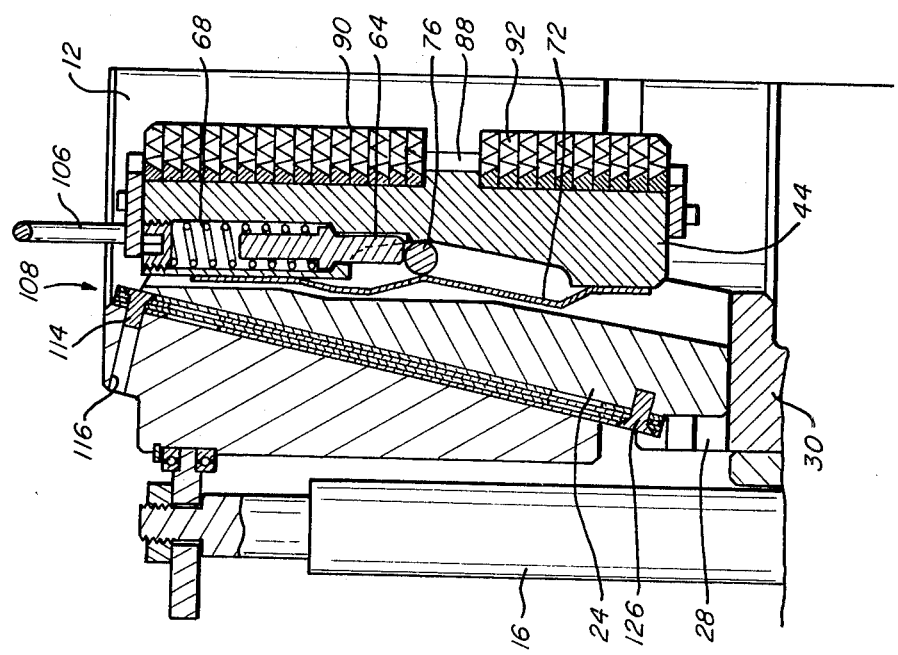
FIG. 6 is a fragmentary view, in partial section, of the power slip assembly of FIG. 1 with the drive sleeve lowered to extend the slip carriers radially inwardly.

A friction plate assembly shown generally at 108 in FIG. 5 is provided to complete the linkage between the drive sleeve 12 and each of the carrier actuators 24. As may be appreciated by reference to FIGS. 1 and 5–7, each of the friction plate assemblies 108 includes a pair of metal friction plates 110 enclosing, at one end, a spacer 112 and held fixed to the drive sleeve surface 20 by bolts 114. Throughbores 116, partially threaded, receive the bolts 114 to fasten the plates 110 to the drive sleeve 12 at the surface 20 as shown in FIGS. 6 and 7. A second spacer 118 maintains the plates 110 separated from actual physical contact with the drive sleeve surface 20.

Each friction plate assembly 108 includes a second pair of metal friction plates 120 separated by a spacer 122 and held to the back surface 34 of each carrier actuator 24. Threaded holes 124 (FIG. 3) are provided in the carrier actuator 24 to receive bolts 126 for this purpose. Another spacer 128 maintains the friction plates 120 from physical contact with the carrier actuator surface 34.

The two pairs of friction plates 110 and 120 are interleaved, or meshed. The spacers 112, 118, 122 and 128 are of such thickness to allow physical contact between adjacent surfaces of the intermeshed plates of the pairs 110 and 120, as well as contact between the carrier actuator surface 34 and the adjacent one of the plates 110, and between the drive sleeve surface 20 and the adjacent one of the plates 120. Such contact between adjacent surfaces is maintained firmly by the bolts 114 and 126 so that, even in the presence of oil or grease on the surfaces, substantial frictional forces may be developed retarding the movement of the friction plates 110 and 120 relative to each other as well as relative to the adjacent carrier actuator surfaces 34 and drive sleeve surfaces 20. A plurality of holes 130 are provided through each of the friction plates 110 and 120 to permit draining and flushing of such oil and/or grease to prevent hydroplaning of any of the surfaces. As may be appreciated by reference to FIGS. 6 and 7, longitudinal movement of the drive sleeve 112 results not only in horizontal, radial movement of the carrier actuators 24 along the T-slot connectors 28 with the slip carriers 44 attached, but also causes relative movement of the friction plates 110 with respect to the remaining friction plates 120. Such movement of the plates 110 and 120 is retarded by the frictional forces thus generated. Consequently, the friction forces generated by use of the friction plate assemblies 108 also retard the longitudinal movement of the drive sleeve 12.

The drive sleeve 12 is raised by operation of the fluid pressure cylinders 16 to retract the carrier actuators 24 and the slip carriers 44 for the purpose of releasing a pipe member within a passage A between the slip carriers, or for clearing the passage A to insert a pipe member therein. When the pipe member is to be grippingly engaged by the slips 90 and/or 92, the fluid pressure cylinders are again operated to lower the drive sleeve 12 to propel the carrier actuators 24 and the slip carriers 44 radially inwardly until the pipe is so engaged by the slips. The carrier actuators 24 only move radially relative to the longitudinal axis of the passage A in response to such longitudinal movement of the drive sleeve. Hence the slips 90 and/or 92 engage and disengage the pipe members by radial movement only.

As described hereinbefore, the springs 68 and the plungers 64 act against gravity to center each slip carrier 44 vertically relative to the corresponding pin 76. However, once vertically-directed forces are applied to the pipe member engaged by the slips, a wedging action occurs accompanied by vertical displacement of the slip carriers 44. The wedging mechanism may be appreciated by reference to FIGS. 8, 8A, 9 and 9A.

Figure 8:
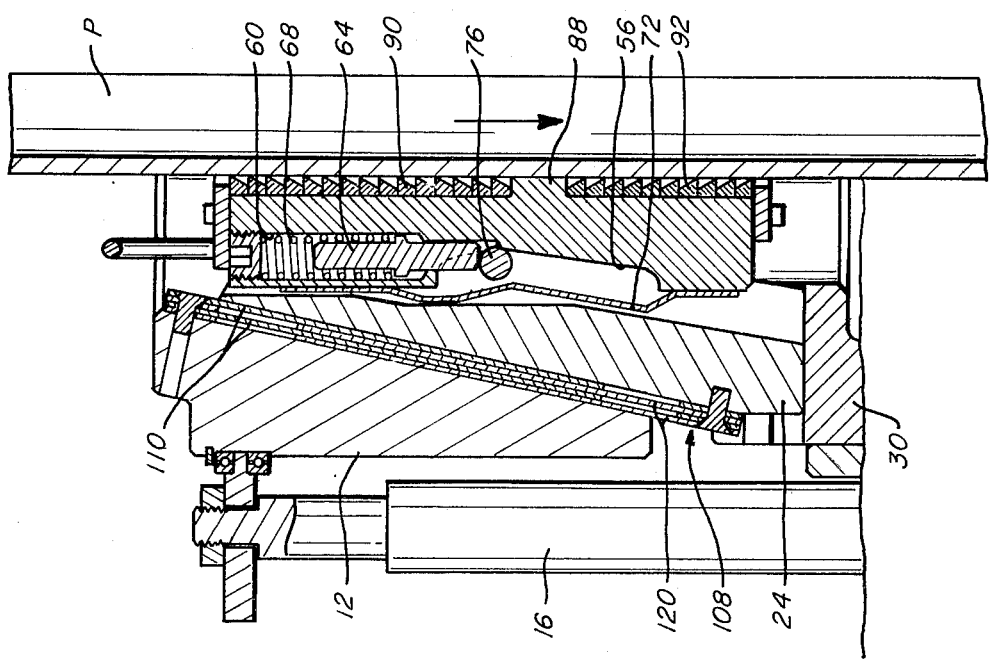
FIG. 8 is a view similar to FIG. 6, but showing the slips engaging a pipe member and applying upwardly-directed force thereto.
Figure 8A:
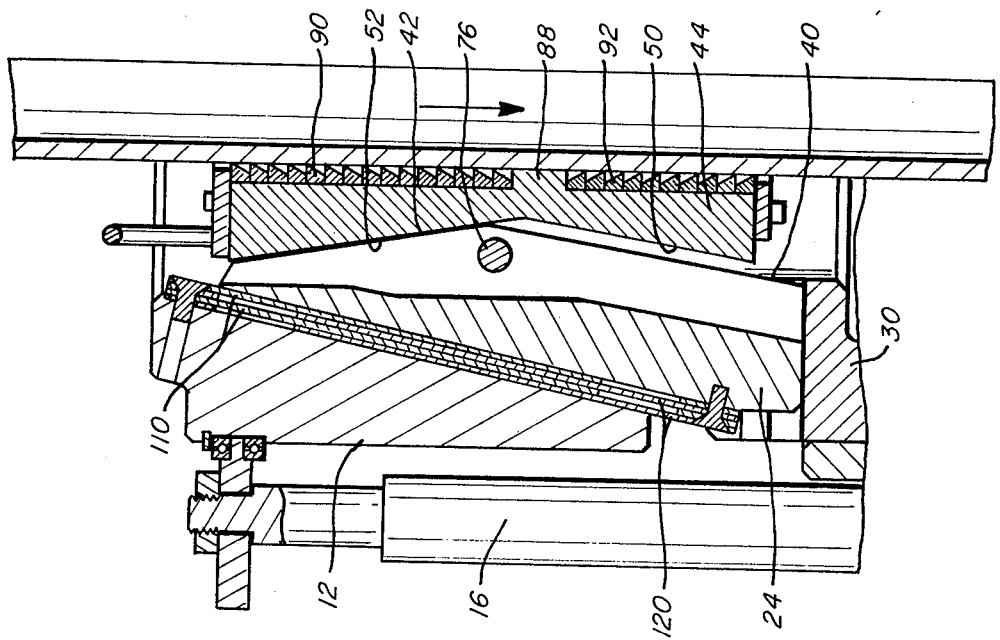
FIG. 8A is a view similar to FIG. 8 but taken along a cross section to show engagement of the slip carrier surface with the carrier actuator surface.

As may be appreciated by reference to FIGS. 8 and 8A, when upwardly-directed forces are imparted by the power slip assembly 10 to pipe members P gripped thereby, the slip carriers 44 are displaced vertically downwardly relative to the carrier actuators 24. Thus, as shown in FIG. 8A, the apex of the slip carrier surfaces 50 and 52 is positioned below the level of the longitudinal axis of the retainer pin 76. This downward displacement of the slip carriers 44 relative to the carrier actuators 24 is due to the tendency of the pipe member P to move downwardly relative to the power slip assembly 10, and to drag with the pipe member the slip carriers grippingly engaged thereto. As a result of such vertical displacement of the slip carriers 44, the upper slip carrier surfaces 52 abut the upper carrier actuator surfaces 42, as illustrated in FIG. 8A. Consequently, the slip carrier 44 becomes wedged between the pipe member P and the carrier actuator surfaces 42, thereby tending to increase the lateral forces by which the slip carrier 44 grippingly engages the pipe member P. The upper slips 90 are then utilized to impart such upwardly-directed forces to the pipe member P.

Upwardly-directed forces may be imparted to pipe members for example in well working operations where the power slip assembly 10 is mounted for vertical movement relative to the well, and where the power slip assembly is thus utilized to grip a pipe string and withdraw same from the well. Also, in well working operations where pipe members are being lowered into the well, the power slip assembly 10 may be used to impart upwardly-directed forces to, at least in part, support the weight of a pipe string being lowered into the well.

Figure 9:
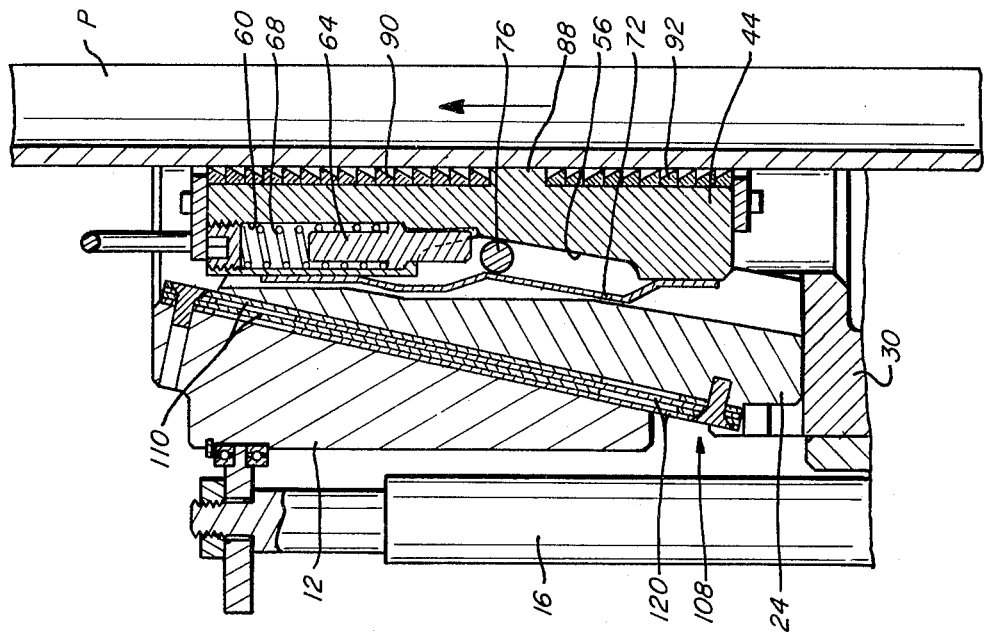
FIG. 9 is a view similar to FIG. 8 but with downwardly-directed force being applied to a pipe member by the power slip assembly.
Figure 9A:
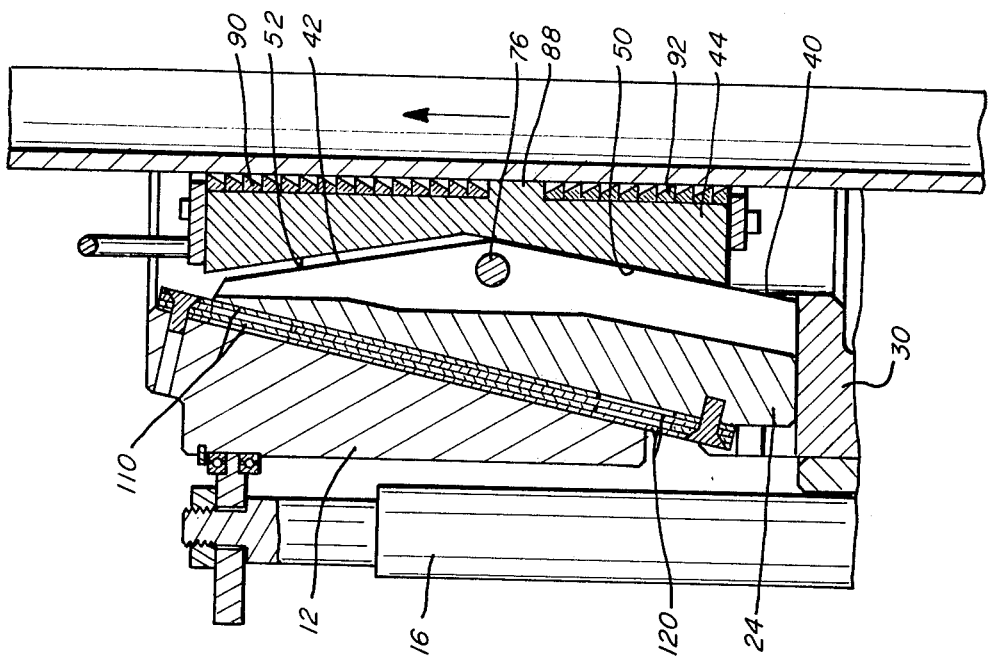
FIG. 9A is a view similar to FIG. 9 but taken along a cross section to show engagement of the slip carrier surface with the carrier actuator surface.

FIGS. 9 and 9A illustrate the wedging of the slip carriers 44 when the power drive assembly 10 is used to impart downwardly-directed forces to a pipe member P grippingly engaged by means of the slips 92. Such downwardly-directed forces may be applied to pipe members, for example, during a snubbing operation in which the power drive assembly 10, mounted as a traveling head in a snubbing unit, grips the pipe members and is propelled downwardly to force the pipe member into a well. Similarly, downwardly-directed forces may be applied on a pipe member by means of the power drive assembly 10 when the power drive assembly is used to hold, or anchor, a pipe string extending into a high pressure well where the downhole well pressures are tending to propel the pipe string upwardly, as indicated by the arrow.

As illustrated in FIG. 9A, the slip carrier 44 is displaced upwardly relative to the carrier structure 24 so that the apex of the slip carrier surfaces 50 and 52 is positioned above the level of the longitudinal axis of the retaining pin 76. The plunger 74 is no longer in contact with the retainer pin 76. This upward displacement of the slip carrier 44 relative to the carrier actuator 24 is a result of the tendency of the pipe member P, gripped by the slips 92 of the slip carrier tending to move upwardly relative to the power slip assembly 10. As a result of the upward displacement of the slip carrier 44 relative to the carrier actuator 24, the lower slip carrier surfaces 50 are abutted against the lower carrier actuator surfaces 40, as illustrated in FIG. 9A. Consequently, the slip carrier 44 is thus wedged between the pipe member P and the lower carrier actuator surfaces 40. This wedging action tends to urge the lower slips 92 into tighter gripping engagement with the pipe member P. These lower slips 92 are thus used to impart upwardly-directed forces to the pipe member P.

Although the angle of slope of the carrier actuator surfaces 40 and 42, and the slip carrier surfaces 50 and 52, measured relative to the vertical, or to the longitudinal axis of the passage A may be varied to vary the wedging effect, it has been found that, in a typical power slip assembly 10 for use with oil and gas well pipe strings, the acute angle of slope of these surfaces may be set at $9\frac{1}{2}°$.

As noted hereinbefore, the slip carrier shoulder 88 carries the load imparted by the slips to pipe members gripped thereby where such forces are directed either upwardly or downwardly. The sloping of the wedging surfaces 50 and 52 of the slip carrier 44, matching the sloping of the corresponding wedging surfaces 40 and 42 of the carrier actuator 24, provide the wedging effect for imparting either upwardly, or downwardly, directed forces to a pipe member P so that the same slip carriers may be utilized for both force-transmitting operations. Further, there is no requirement with the power slip assembly of the present invention to invert either the slip carriers or the drive sleeve or any other portion of the power slip assembly to reconfigure the power slip assembly for imparting upwardly or downwardly directed forces. Also, when force is no longer being applied to a pipe member by means of the slip carriers, the slip carriers are returned to their vertically centralized configuration relative to the carrier actuators 44. Thus, for example, where the slip carriers 44 have been displaced downwardly relative to the carrier actuators 24 during the transmission of upwardly-directed forces to pipe members, the biasing of the plungers 64 downwardly by the compressed springs 68 causes the plungers to press against the retainer pins 76 and thereby raise the slip carriers 44 to the normal, centralized positions. Also, where the slip carriers had been elevated during the transmission of downwardly-directed forces to pipe members gripped thereby, gravity returns the slip carriers to their centralized positions, with the plungers 64 supporting the slip carriers against the retainer pins 76. Consequently, the power slip assembly 10 is automatically in configuration to grip a pipe member and to impart thereto either upwardly or downwardly directed forces without the need for any adjusting or rearranging of the slip assembly components.

When a pipe member is gripped by the power slip assembly 10, the slips 90 and 92 may be used to impart torque, or rotational forces, to the pipe member as discussed hereinbefore. The particular construction features of the power slip assembly 109 by which such torque may be imparted to pipe members may be appreciated by reference to FIGS. 1 and 10. The base ring 30 on which are mounted the female T-slot connectors 28 includes an annular, outwardly-extending flange 132 on which is fixedly mounted a large double-chain sprocket 134. The ring 30 is supported by an annular race 136 which rides on a plurality of roller bearings 138 constrained between the race 136 and a second annular race 140.

The base 14 includes an annular collar 142 forming a trough with upwardly-extending inner and outer walls 144 and 146, respectively. The lower race 140 abuts an annular shoulder 148 of the collar 142.

An annular top plate 150 rests on, and is held by bolts 152 to the outer collar wall 146. An annular shoulder 154 of the top plate 150 abuts an outer annular race 156 which cooperates with a complimentary inner annular race 158 to constrain a plurality of ball bearings 160. The races 156 and 158 also reside against the sprocket 134, with the inner race 158 further abutting the ring 30. The races 156 and 158 are thus constrained against both horizontal and vertical movement by the combination of the top plate 150, the sprocket 134, and the ring 30. Similarly, the races 136 and 140 are constrained against horizontal movement by the collar 142. The restraining of the ring 30 against vertical movement by the top plate 150 also provides constraints to the races 136 and 140 against vertical movement. The ball bearings 160 thus bear the load against horizontal, or lateral, movement of the ring 30 relative to the base 14. The roller bearings 138 bear the load against both lateral movement as well as vertical movement of the base ring 30 relative to the base 14, and further support the ring 30 and the carrier actuators 24 linked thereto.

The drive sleeve 12 is linked to the piston rods 161 of the fluid pressure cylinder assemblies 16 by means of a centering plate 162 held to the piston rods by nuts 164. Upper and lower bearing assemblies, 166 and 168, respectively, each including a plurality of ball bearings constrained between a pair of complimentary annular races, provide the coupling between the drive sleeve 12 and the plate 162. The bearing assemblies 166 and 168 are respectively held between appropriate shoulders on the plate 162 and within an appropriate groove in the drive sleeve 12. A snap ring 170 locks the bearing assemblies 166 and 168 in place.

The drive sleeve 12 is thus rotatable on the bearing assemblies 166 and 168 relative to the fluid pressure cylinder assemblies 16. The base ring 30 and the sprocket 134 are rotatable relative to the base 14 on the bearings 160 and 138. The ring 30 is coupled to the drive sleeve 12 by means of the carrier actuators 24 which are joined to the ring and the drive sleeve by corresponding T-slot connections as described hereinbefore. The assembly of components including the base ring 30, with the sprocket 124, the drive sleeve 12, the carrier actuators 24 and the carrier slips 44 is thus rotatable as a unit relative to the base 14. To insure such unitary rotation, and to carry the torque load between the ring 30 and the drive sleeve 12, the ring 30 is fitted with three torque rods 172 extending upwardly and received by three corresponding bores 174 in the drive sleeve. The length of the torque rods 172 is such that the torque rods remain penetrating the bores 174 in torque-transmitting engagement even though the drive sleeve 12 is raised by the fluid pressure cylinder assemblies 16 to retract the slip carriers 44 as shown in FIG. 7. Thus, rotation of the ring 30 imparts torque, by way of the torque rods 172, to the drive sleeve 12 for all positions of the drive sleeve, and without need of the torque being transmitted to the drive sleeve by way of the carrier actuators.

A pair of hydraulic motors 176 is mounted on the base plate 150 on opposite sides of the drive sleeve 12.

The drive shaft 178 of each of the motors extends downwardly within the cavity defined by the collar 142 and the top plate 150, and carries a sprocket 180 rotationally fixed to the drive shaft by a key 182. Each of the sprockets 180 is a double-chain type compatible with the larger sprocket 134. A chain 184 closes and is engaged and meshed with the sprockets 180 and 134 as illustrated in FIGS. 1 and 10. The hydraulic motors 176 may be operated from a common hydraulic fluid pressure source in unison to propel the corresponding sprockets 180 to drive the chain 184 to impart rotational motion to the sprocket 134 and, therefore, the base ring 30. In this way, the drive sleeve 12, the attached carrier actuator 24 and the slip carriers may be selectively rotated to impart torque to a pipe member P gripped by the slips 90 and/or 92 as illustrated in FIGS. 8 and 9. Such rotational motion, or torque, may be imparted to the gripped pipe member regardless of whether upwardly or downwardly-directed forces are being imparted thereto by the power slip assembly 10 at the same time.

The torque-transmitting capability of the power slip assembly 10 may be utilized in making up or breaking connections between adjacent pipe members in a pipe string during well working operations. To this end, a pipe member gripped by the power slip assembly 10 may be rotated thereby to engage or disengage threads of the rotating pipe member relative to threads of a second pipe member held stationary by other means. Also, the power slip assembly 10 may be used to apply torque to prevent rotation of a pipe member gripped thereby by holding the sprocket 134 against rotation, for example. Further, a pipe string itself may be rotated by use of the power slip assembly 10 during well drilling of workover operations.

The upwardly-extending wall 144 of the base collar 142 includes, in an appropriate groove, a packing member 186 which provides a fluid-tight seal between the wall and the ring 30. A similar packing seal 188 is carried in an appropriate groove by the ring 30 to provide a fluid-tight seal between the ring and the top plate 150 of the base 14. The top plate 150 is fluid-sealed to the upwardly-extending wall 146 of the base collar 142 by an O-ring seal 190 carried in an appropriate groove in the wall 146. Consequently, the cavity defined by the collar 142, the top plate 150, and the ring 30 may be flooded with lubricant such as oil to provide a lubricating bath for the sprockets 134 and 180, the chain 184, and the bearings 138 and 160.

The base collar 142 includes a lower annular flange 192 equipped with throughbores 194 by which the entire power slip assembly may be bolted to, for example, the framework of a fluid pressure drive assembly of a snubbing device, to a well workover rig, or to some other support means.

The present invention provides a power slip assembly which may readily apply upward or downwardly directed forces to pipe members, or may apply torque to such members gripped within the slips of the power slip assembly. Such a power slip assembly may be utilized in either raising pipe strings, or snubbing pipe strings down into wells against well pressures. Further, the power slip assembly may be utilized in applying torque, and even rotating pipe members gripped by the slips thereof. Such different types of forces may be imparted to pipe members by the present invention without any reconfiguring of the slips or the drive sleeve. The centering of the slip carriers, in the absence of gripping engagement with pipe members by the slips carried thereon, is automatic and places the slip carriers in condition for engaging pipe members to apply either upwardly or downwardly directed forces as well as torque.

The power slip assembly of the present invention provides both upwardly and downwardly directed forces with a single drive sleeve and a single set of slips. Further, the vertical stroking of the drive sleeve to manipulate the carrier actuators and slip carriers radially to engage or release pipe members is the same regardless of whether upwardly or downwardly directed forces have been or are to be applied by the slips. Additionally, pipe members of a broad range in cross-sectional diameter may be manipulated by the power drive assembly 10, with the slip carriers 44 gripping the pipe at different radial positions depending on the pipe size.

It will be appreciated that the angle of slope of the drive sleeve surfaces 20 and the carrier actuator surfaces 34 determine the length of vertical stroke required of the drive sleeve to move the carrier actuators radially a given distance. If the acute slope angle, measured relative to the vertical, or the longitudinal axis of the passage A, is decreased, the drive sleeve stroke length increases, requiring a taller drive sleeve, longer fluid cylinder assemblies 16 and more operating room for the power slip assembly although the tangential load generated between the surfaces 20 and 34 when pipe is being gripped would decrease. The slope may be so steep that vertical forces exerted in the slips by the pipe during, for example, snubbing operations may tend to propel the drive sleeve upwardly to retract the slips and release the pipe. If the acute slope angle is increased, the required drive sleeve stroke is decreased, but the aforementioned tangential load is increased.

The use of the friction plate assemblies permits a relatively steep angle of contact between the drive sleeve and the carrier actuators without permitting the radial forces to propel the drive sleeve upwardly to thereby release the pipe member. The friction plate assemblies increase the surface areas for generating friction, thereby effectively increasing the frictional forces between the carrier actuators and the drive sleeve sufficiently to prohibit inadvertent and undesired release of the pipe member. Thus, the acute slope angle of the surfaces 20 and 34 may be decreased to, say, 12° without permitting pipe loading to inadvertently move the drive sleeve. The relatively steep angle of contact between the drive sleeve and the carrier actuators then permits sufficient radial movement of the carrier actuators to accommodate a large variety of pipe widths while effecting such carrier actuator movement with a relatively short stroke of the drive sleeve.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. Apparatus for manipulating tubular members comprising:
   (a) slip carrier means mounted on carrier actuator means arranged generally about a passage and movable generally radially relative thereto;
   (b) slip means, for gripping such tubular member, on said slip carrier means whereby movement by said slip carrier means generally radially inwardly relative to said passage may effect gripping engagement between said slip means and said tubular member within said passage;

(c) first surface means as part of said slip carrier means and second surface means as part of said carrier actuator means for cooperating with said first surface means for wedging said slip carrier means and said slip means against said tubular member so engaged by said slip means when longitudinal force is applied to said tubular member by said slip means; and (d) drive means linked to said carrier actuator means whereby generally longitudinal movement of said drive means propels said carrier actuator means radially relative to said passage.

2. Apparatus as defined in claim 1 further comprising torque means whereby said carrier actuator means, said slip carrier means and said slip means may transmit torque to said tubular member generally about its axis.

3. Apparatus as defined in claim 2 or, in the alternative, as defined in claim 1 wherein:

(a) said carrier actuator means are mounted by first T-slot connection means oriented generally radially relative to said longitudinal passage whereby said carrier actuator means are movable generally radially relative to said passage, and (b) said carrier actuator means are so linked to said drive means by second T-slot connection means arranged generally about said passage and oriented generally sloped relative thereto whereby generally longitudinal movement of said drive means in one sense propels said carrier actuator means generally radially inwardly relative to said passage and generally longitudinal movement of said drive means in the opposite sense propels said carrier actuator means generally radially outwardly relative to said passage.

4. Apparatus as defined in claim 3 further comprising friction means for generating frictional forces between said carrier actuator means and said drive means.

5. Apparatus as defined in claim 4 wherein said friction means comprises a plurality of first plates connected to said carrier actuator means and a plurality of second plates connected to said drive means and interleaved with said first plates whereby relative movement between said carrier actuator means and said drive means along said first T-slot connection means is accompanied by relative movement between said first and second plates.

6. Apparatus as defined in claim 2 wherein:

(a) said first surface means comprises first wedge means and second wedge means;

(b) said second surface means comprises first wedging surface means and second wedging surface means;

(c) said first wedge means and said first wedging surface means are sloped relative to said passage for wedging said slip carrier means and said slip means against said tubular member so engaged by said slip means when longitudinal force is applied to said tubular member in one sense; and (d) said second wedge means and said second wedging surface means are sloped relative to said passage to wedging said slip carrier means and said slip means against said tubular member so engaged by said slip means when longitudinal force is applied to said tubular member in the opposite sense.

7. Apparatus as defined in claim 6 further comprising centralizer means for centering said slip carrier means relative to said carrier actuator means to neutralize said first and second wedge means relative to said first and second wedging surface means when no tubular member is engaged by said slip means.

8. Apparatus as defined in claim 7 wherein said centralizer means comprises plunger means biased by spring means.

9. Apparatus as defined in claim 2 wherein said torque means comprises:

(a) sprocket means linked to said carrier actuator means;

(b) selectively operable fluid pressure power means; and (c) flexible connector means linking said fluid pressure power means and said sprocket means whereby torque may be so transmitted to said tubular member by selective operation of said fluid pressure power means.

10. Apparatus as defined in claim 9 or, in the alternative, as defined in claim 2, wherein said slip carrier means are so mounted on said carrier actuator means that application of torque to said carrier actuator means by said torque means wedges said slip means against said tubular member engaged thereby.

11. Apparatus as defined in claim 1 wherein:

(a) said first surface means comprises first wedge means and second wedge means;

(b) said second surface means comprises first wedging surface means and second wedging surface means;

(c) said first wedge means and said first wedging surface means are sloped relative to said passage for wedging said slip carrier means and said slip means against said tubular member so engaged by said slip means when longitudinal force is applied to said tubular member in one sense; and (d) said second wedge means and said second wedging surface means are sloped relative to said passage for wedging said slip carrier means and said slip means against said tubular member so engaged by said slip means when longitudinal force is applied to said tubular member in the opposite sense.

12. Apparatus as defined in claim 11 further comprising centralizer means for centering said slip carrier means relative to said carrier actuator means to neutralize said first and second wedge means relative to said first and second wedging surface means when no tubular member is engaged by said slip means.

13. Apparatus as defined in claim 12 wherein said centralizer means comprises plunger means biased by spring means.

14. Power slip apparatus for manipulating pipe members comprising:

(a) a base;

(b) a drive sleeve generally circumscribing a passage and connected to said base by power means for selectively propelling said drive means longitudinally generally along said passage;

(c) a plurality of slip carriers and an equal number of carrier actuators, each said slip carrier mounted on a corresponding carrier actuator, said carrier actuators arranged about said passage, with said slip carriers generally directed toward said passage, and mounted for radial movement relative to said passage;

(d) slip means, for gripping and imparting force to such pipe member within said passage, on said slip carriers;

(e) sloped linkage means connecting said carrier actuators to said drive sleeve whereby longitudinal movement to said drive sleeve in one sense propels said carrier actuators radially inwardly, and longitudinal movement of said drive sleeve in the opposite sense propels said carrier actuators radially outwardly;

(f) wherein each of said carrier actuators includes first surface means generally facing toward and along said passage in said one sense, and second surface means generally facing toward and along said passage in said opposite sense;

(g) wherein each of said slip carriers includes third surface means generally facing away from and along said passage in said other sense, and fourth surface means generally facing away from and along said passage in said one sense; and (h) wherein each of said slip carriers is movable longitudinally relative to said carrier actuators when longitudinally-directed force is applied to said pipe member by said slips engaging said pipe member whereby, when such force is so applied in said one sense, said first and third surface means cooperate to wedge said slip carrier and slips against said pipe member, and when such force is so applied in said other sense, said second and fourth surface means cooperate to wedge said slip carriers and slips against said pipe member.

15. Power slip apparatus as defined in claim 14 further comprising centralizer means whereby said slip carriers are maintained at longitudinally neutral positions relative to said carrier actuators when said slips are not engaging a pipe member.

16. Power slip apparatus as defined in claim 15 further comprising pin means for locking said slip carriers to said carrier actuators.

17. Power slip apparatus as defined in claim 16 wherein said centralizer means comprises plunger means, biased by spring means, for acting against said pin means.

18. Power slip apparatus as defined in claim 15 wherein said centralizer means comprises plunger means, biased by spring means.

19. Power slip apparatus as defined in claim 14 further comprising torque means, including:

(a) ring means, on which said carrier actuators are so mounted for radial movement relative to said passage;

(b) sprocket means;

(c) selectively operable second power means; and (d) flexible connection means linking said second power means with said sprocket means whereby operation of said second power means effects transmission of torque to said ring means and to said slip means.

20. Power slip apparatus as defined in claim 19 wherein each of said carrier actuators is so mounted on said ring means by T-slot connections oriented generally radially relative to said passage and along which connections said carrier actuators are movable.

21. Power slip apparatus as defined in claim 20 wherein said second power means comprises two hydraulic motors.

22. Power slip apparatus as defined in claim 20 wherein said flexible connection means comprises chain means.

23. Power slip apparatus as defined in claim 20 or, in the alternative, as defined in claim 19 further comprising torque rods connecting said ring means with said drive sleeve for transmission of torque therebetween.

24. Power slip apparatus as defined in claim 14 wherein each of said carrier actuators is so mounted for radial movement relative to said passage by T-slot connections oriented generally radially relative to said passage and along which connections said carrier actuators are movable.

25. Power slip apparatus as defined in claim 24 wherein said sloped linkage means comprises a sloped T-slot connection between each of said carrier actuators and said drive sleeve whereby, as said drive sleeve moves longitudinally in said one sense, said sloped T-slot connections contract to propel said carrier actuators radially inwardly relative to said passage, and as said drive sleeve moves longitudinally in said opposite sense, said sloped T-slot connections expand to propel said carrier actuators radially outwardly relative to said passage.

26. Power slip apparatus as defined in claim 25 or, in the alternative, as defined in claim 14 further comprising friction means, as part of said sloped linkage means, for providing frictional forces to resist relative motion between said carrier actuators and said drive sleeve.

27. Power slip apparatus as defined in claim 26 wherein said friction means comprises a plurality of first plates fixed to each of said carrier actuators and interleaved with a plurality of second plates fixed to said drive sleeve whereby, as said drive sleeve moves longitudinally, and said carrier actuator move radially, said first plates and said second plates move relative to each other.

28. Power slip apparatus as defined in claim 14 wherein said sloped linkage means comprises a sloped T-slot connection between each of said carrier actuators and said drive sleeve whereby, as said drive sleeve moves longitudinally in said one sense, said sloped T-slot connections contract to propel said carrier actuators radially inwardly relative to said passage, and as said drive sleeve moves longitudinally in said opposite sense, and sloped T-slot connections expand to propel said carrier actuators radially outwardly relative to said passage.

29. Power slip apparatus as defined in claim 28 further comprising friction means, as part of said sloped linkage means, for providing frictional forces to resist relative motion between said carrier actuators and said drive sleeve.

30. Power slip apparatus as defined in claim 29 wherein said friction means comprises a plurality of first plates fixed to each of said carrier actuators and interleaved with a plurality of second plates fixed to said drive sleeve whereby, as said drive sleeve moves longitudinally, and said carrier actuators move radially, said first plates and said second plates move relative to each other.

31. Power slip apparatus as defined in claim 14 wherein said power means comprises fluid pressure piston-and-cylinder means.

32. Power slip apparatus as defined in claim 19 wherein each of said slip carriers is so mounted on said corresponding carrier actuator with lateral slack whereby, when said slips engage such pipe member, and torque is transmitted to said pipe member by said slips, said slip carriers may move laterally relative to said carrier actuators whereby said slip carriers and said slips are wedged against said pipe member by said carrier actuator.

* * * * *